(No Model.)

C. N. WAITE.
SYSTEM OF INCLINED TROUGHS WITH INCLOSED STEAM PIPES FOR EVAPORATING SALINE OR SACCHARINE LIQUIDS.

No. 331,587. Patented Dec. 1, 1885.

Witnesses.
H. L. N. Lili
Horace Brown

Inventor
C. N. Waite
by Night & Brown
Attys.

UNITED STATES PATENT OFFICE.

CHARLES N. WAITE, OF MEDFORD, MASSACHUSETTS.

SYSTEM OF INCLINED TROUGHS WITH INCLOSED STEAM-PIPES FOR EVAPORATING SALINE OR SACCHARINE LIQUIDS.

SPECIFICATION forming part of Letters Patent No. 331,587, dated December 1, 1885.

Application filed September 1, 1884. Serial No. 142,007. (No model.)

*To all whom it may concern:*

Be it known that I, CHARLES N. WAITE, of Medford, in the county of Middlesex and State of Massachusetts, have invented certain Improvements in a System of Inclined Troughs with Inclosed Steam-Pipes for Evaporating Saline or Saccharine Liquids, of which the following is a specification.

This invention has for its object to provide an improved apparatus for evaporating liquids, whereby simplicity and economy of construction are secured, and provision is made for the free and rapid escape of the vapor or steam caused by evaporation, and for the prevention of too long continued heating and too high a degree of heat.

To these ends my invention consists in the improvements which I will now proceed to describe and claim.

Figure 1:
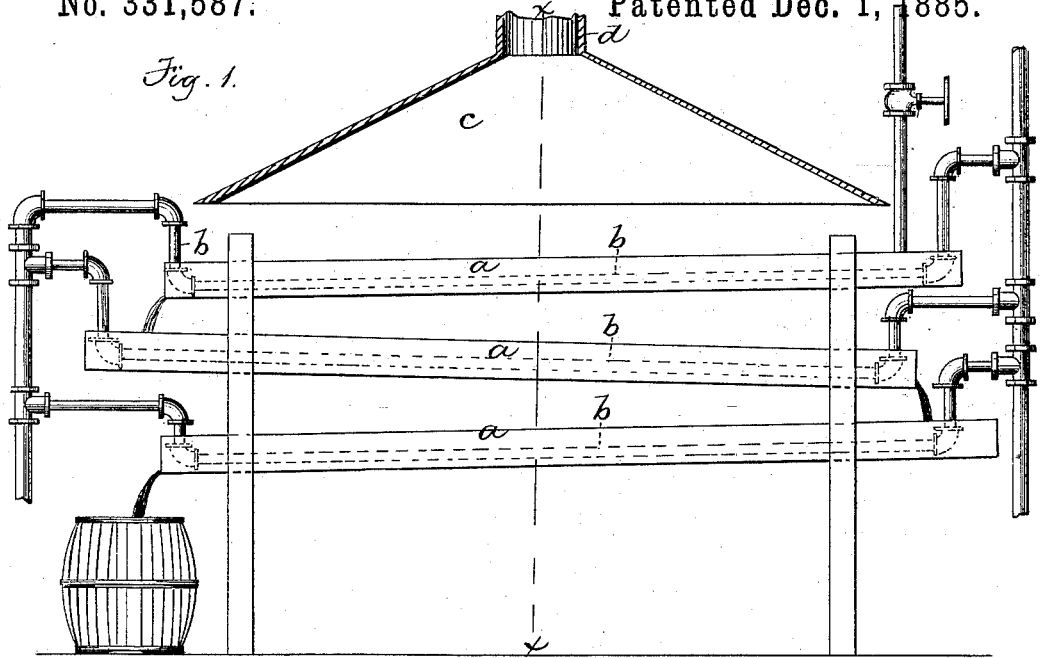
Figure 2:
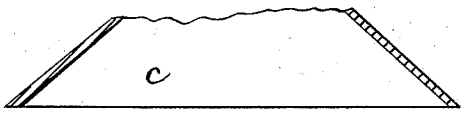
Figure 3:
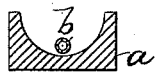
Figure 4:
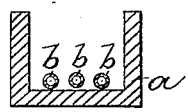

Of the accompanying drawings, forming a part of this specification, Figure 1 represents a side elevation of an evaporating apparatus embodying my invention. Fig. 2 represents a section on line *x x*, Fig. 1. Figs. 3 and 4 represent modifications.

The same letters of reference indicate the same parts in all the figures.

In carrying out my invention I construct an open trough, *a*, having a slight inclination—say one inch in ten feet—and place in the bottom of said trough one or more steam-pipes, *b*, extending lengthwise through the trough, with its surface exposed to the liquid flowing through the trough. In constructing an apparatus I prefer to employ several of these troughs arranged in a vertical series, as shown in Fig. 1, the upper one receiving the liquid to be evaporated, and each after the upper one receiving the liquid from the one above it.

Each series of troughs is preferably of such length that the liquid, in passing through it, will not be exposed too long to the steam-pipes, liquids containing organic substances—such as sugar-liquor and other liquids—being blackened by too long continuous heating. I find that a suitable length for each series of troughs is about thirty feet, and the time that the liquid should consume in passing through each trough should be from one minute to one minute and a half.

I prefer to make each trough V-shaped in cross-section, as shown in Fig. 2. Other forms may be adopted, however, as shown in Figs. 3 and 4, Fig. 3 showing the trough as made of a single piece of wood grooved to form the passage for the liquid. Two or more pipes may be placed in each trough, as shown in Fig. 4; but I prefer a single pipe for convenience of construction. The amount of liquor supplied is preferably such as will form a stream which will barely cover the pipe or pipes in the trough.

I do not limit my invention to the use of a series of troughs, since a single trough with its heating-pipe embodies the essential feature of the invention.

It is obvious that the trough may be made of any desired length, the total length being preferably thirty feet.

A hood, *c*, communicating with a flue, *d*, leading to an exhaust-fan is preferably placed over the series of troughs.

The advantages of my improved construction are a rapid evaporation without long-continued heating of any one portion of the liquor and a free current of air over the surface of the liquor to carry off steam as fast as formed. The chief difficulties heretofore encountered in the concentration of organic solutions—viz., a high temperature and long-continued heating—are thus avoided.

I claim—

1. An evaporator consisting of an inclined open trough with inlet at the upper and outlet at the lower end, and a steam-pipe inside said trough, near the bottom and parallel therewith, said pipe entering the trough from above, near one end, and having its exit above the trough, near the other end, substantially as described.

2. An evaporating apparatus consisting of a series of open troughs arranged one above another, the inclination of each lower trough being in reverse direction from that of the one above it, and each upper trough having an escape at its lower end into the upper end of the trough beneath it, and a steam-pipe inside each trough, parallel with the bottom thereof, the several steam-pipes communicating, substantially as set forth.

In testimony whereof I have signed my name to this specification, in the presence of two subscribing witnesses, this 31st day of May, 1884.

CHARLES N. WAITE.

Witnesses:
C. F. BROWN,
A. L. WHITE.